United States Patent [19]

Burnham, Sr.

[11] 4,326,859

[45] Apr. 27, 1982

[54] DEGASSING OF DRILLING FLUIDS

[76] Inventor: Gerald E. Burnham, Sr., 401 N. Coreil St., Ville Platte, La. 70586

[21] Appl. No.: 143,536

[22] Filed: Apr. 25, 1980

[51] Int. Cl.³ ............................................ B01D 19/00
[52] U.S. Cl. ........................................... 55/52; 55/159
[58] Field of Search ................ 55/52, 159; 74/61, 87; 209/366.5, 367; 210/384, 388

[56] References Cited

U.S. PATENT DOCUMENTS

| | | | |
|---|---|---|---|
| 1,961,232 | 6/1934 | Maust et al. | 175/66 X |
| 2,349,778 | 5/1944 | Teplow | 74/61 |
| 2,514,159 | 7/1950 | Jonsson | 210/384 X |
| 2,668,796 | 2/1954 | Wehmiller et al. | 55/52 X |
| 2,840,354 | 6/1958 | McKellar | 74/61 X |
| 2,861,691 | 11/1958 | Linke et al. | 210/384 X |
| 2,892,353 | 6/1959 | Harshberger | 74/61 |
| 2,927,468 | 3/1960 | Wise | 74/61 |
| 3,000,278 | 9/1961 | Kaltenegger | 74/61 X |
| 3,955,802 | 5/1976 | de Bruyne | 366/276 X |
| 3,975,171 | 8/1976 | Burnham, Sr. et al. | 55/52 X |

Primary Examiner—Robert H. Spitzer
Attorney, Agent, or Firm—Schuyler, Banner, Birch, McKie & Beckett

[57] ABSTRACT

Entrained gas bubbles are removed from drilling fluid by providing a conduit through which drilling fluid may flow with a cavitator disposed within the conduit and elliptically oscillating movements are imparted to the cavitator by drive means associated with the conduit and drivingly connected to the cavitator.

15 Claims, 9 Drawing Figures

DEGASSING OF DRILLING FLUIDS

BACKGROUND OF THE INVENTION

The invention relates to the field of liberating and removing gas that may be entrained in the form of small bubbles in drilling fluid. Basically this contemplates degassing drilling mud such as this term is employed in referring to drilling fluids used in oil well drilling operations.

Typically in well drilling operations substantial quantities of a specially formulated drilling mud or fluid are pumped down through the drill stem to be discharged through apertures located at the drill bit. This drilling mud serves not only to lubricate the drill bit and to remove the displaced rock, sand and other materials from adjacent the bit to a discharge point on the surface of the well site, but also to prevent the escape or blow out of natural gas which may be encountered in conjunction with the drilling operation. In connection with the flow of the drilling mud from the drill bit to the well site surface the mud frequently becomes contaminated with natural gas or air, appearing in the mud in the form of entrained minute bubbles of gas. Considering the cost of the specially formulated drilling mud it is economically desirable to recycle the special drilling mud back through the well instead of continuously supplying new drilling mud material. However, the presence of entrained gas bubbles in the drilling mud, decreases its density and substantially diminishes its efficiency in lubricating the drill bit and its effectiveness to prevent well blow-outs. Accordingly, it is desirable to degas the drilling mud to prepare it for recycling in connection with subsequent well drilling operations.

To perform this required degassing operation, special degassing concepts and systems have been suggested heretofore. The physical characteristics of the drilling mud, particularly its abrasiveness and its high viscosity, generally make liberation of entrained gas bubbles difficult. Frequently, prior art drilling mud degassing has involved centrifugal pumps or other rotary impellers employed to obtain the necessary agitation of the viscous drilling fluid. One drawback found in prior art proposals has been the tendency of the highly viscous drilling fluid to flow around the reciprocating agitator without experiencing the substantial mixing action needed. Such gas that may be removed from the mud immediately adjacent the agitator may not include the gas in the drilling mud that is adjacent the walls of the degassing apparatus.

One prior art degassing proposal for drilling fluids, is set forth in Burnham Sr. et al. U.S. Pat. No. 3,975,171 issued Aug. 17, 1976. Under the teachings of this patent, a cavitator is rapidly reciprocated within a conduit through which the drilling fluid is flowing. The cavitator is located within this flow of drilling fluid and its reciprocating action promotes coalescence of small entrained gas bubbles within the drilling fluid which may then rise more readily to the upper surface of the fluid for removal of this liberated gas.

SUMMARY OF THE INVENTION

A proposal for degassing drilling fluid, or so-called drilling mud, in a continuous flow of the fluid is contemplated by this invention. Thus, as drilling mud is circulated from the well head and thereafter back to the well, the proposal of this invention degasses the fluid as it is circulated.

In accordance with the invention, the drilling fluid is passed between the inlet and outlet of a conduit which provides opposed wall surfaces contacting the drilling fluid. A cavitator providing surfaces respectively spaced from the opposed wall surfaces of the conduit is movably mounted within the conduit for the cavitator's surfaces to also contact the drilling fluid flowing through the conduit. A drive means is drivingly connected to the cavitator which is specially constructed to generate forces that impart elliptically oscillating movements to this cavitator. These elliptically oscillating movements of the cavitator cause the cavitator surfaces to perform an alternately compressing and rarefying action which acts upon the drilling fluid flowing through the conduit. These specially generated forces from the drive means imparted to the cavitator, act on the drilling fluid to most effectively promote coalescence of small entrained gas bubbles into larger bubbles which then may rise to the drilling fluid's surface within the conduit for removal of the gas.

A particular object of this invention is the provision of an improved method and apparatus for degassing drilling fluids whereby a maximum amount of the entrapped gas within the fluid may be removed efficiently.

Another important object of the invention is to provide drilling fluid degassing by generating and effectively imparting elliptically oscillating movements to a cavitator which is disposed within a drilling fluid flow that most efficiently promotes coalescence of small entrained gas bubbles into large bubbles for gas removal.

Other objects and advantages of the invention, hereinafter disclosed in detail, will become apparent from the following description taken in conjunction with the accompanying drawings. The drawings and description of the invention involve several embodiments of such invention which are set forth solely by way of illustration and example.

DETAILED DESCRIPTION OF PREFERRED EMBODIMENTS OF THE INVENTION

Figure 1:
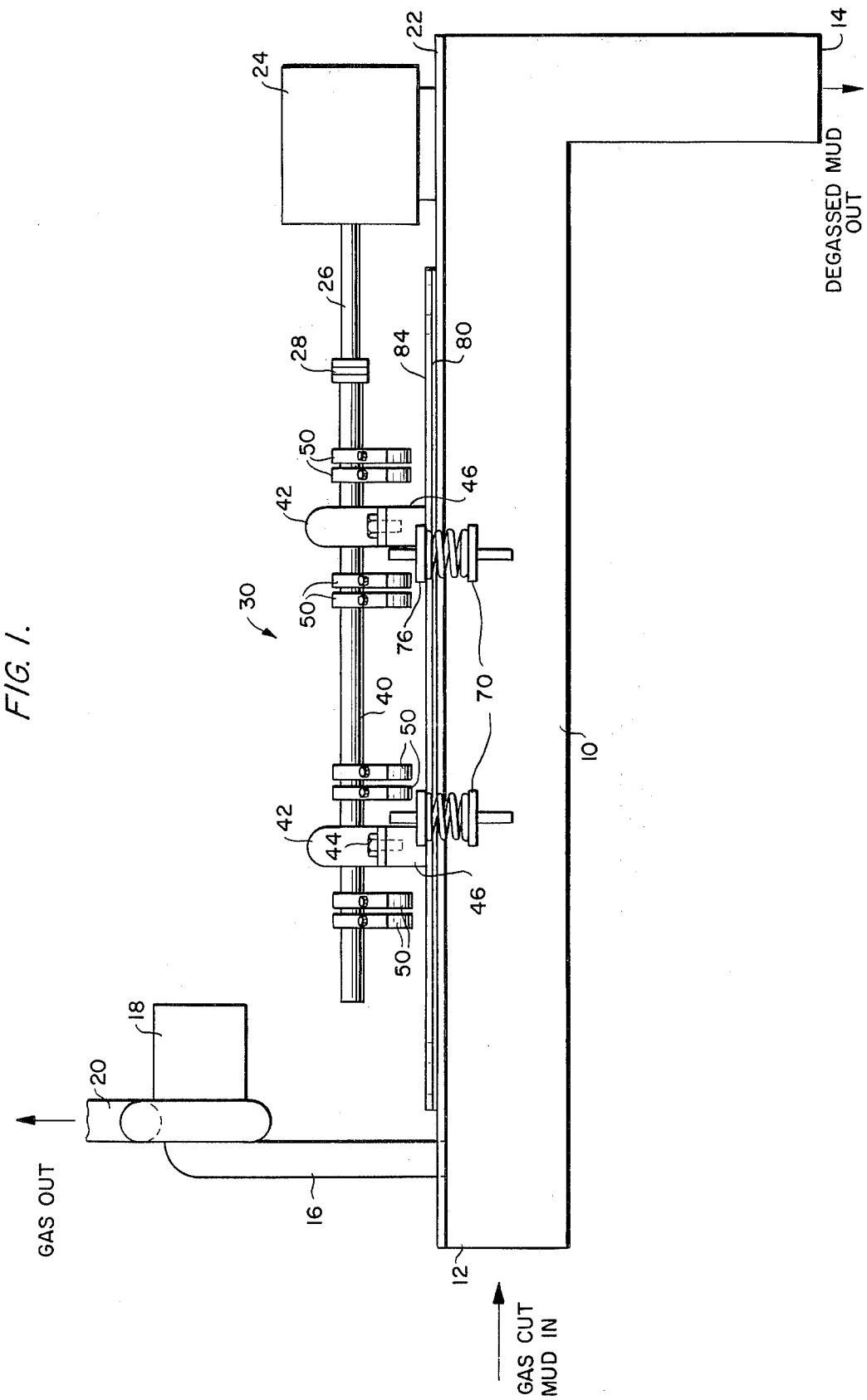
FIG. 1 is a side elevational view showing the invention incorporated into degassing equipment.
Figure 2:
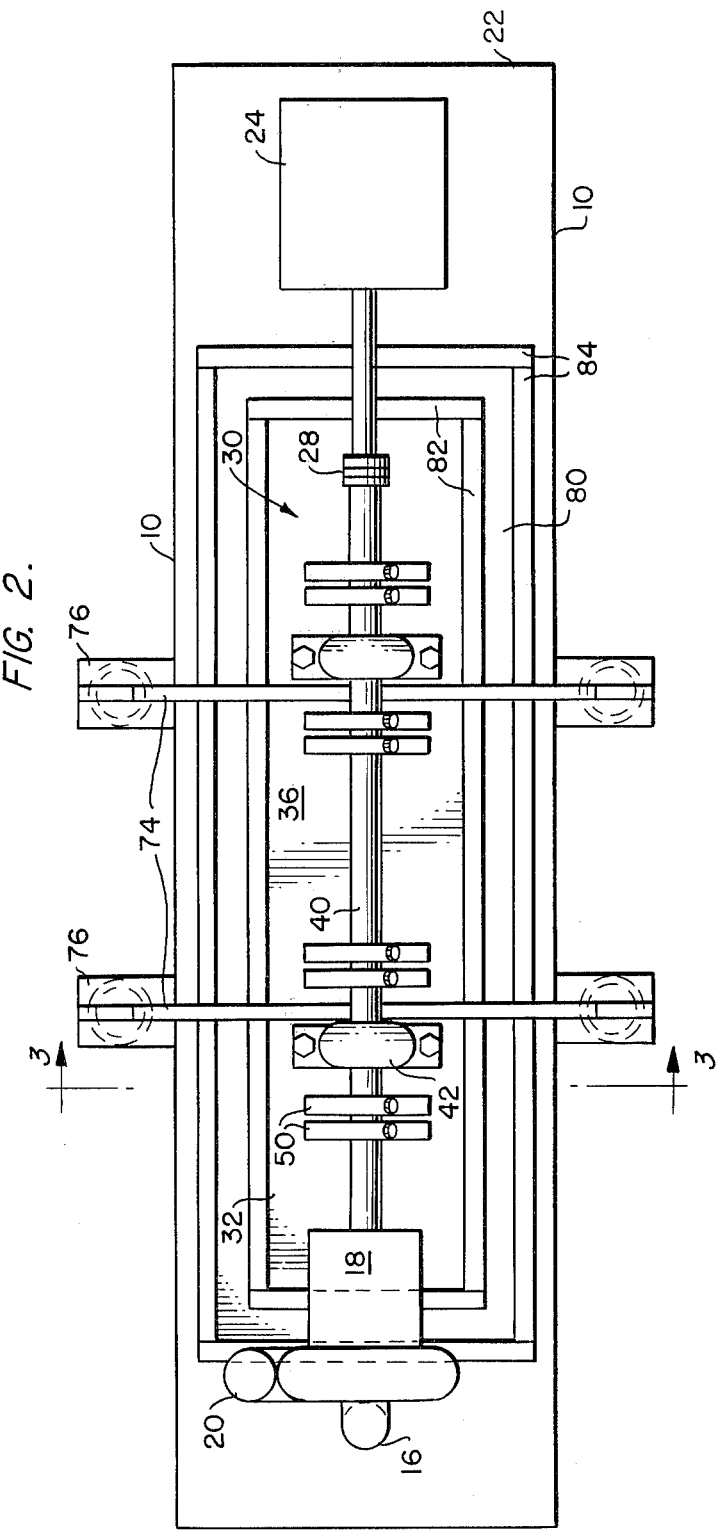
FIG. 2 is a plan view of the apparatus shown in FIG. 1.

The overall features incorporating the invention into degassing equipment may best be seen in FIGS. 1 and 2 on the drawings. A conduit 10, that may be in the form of a tank through which the drilling fluid to be degassed will flow, provides on the interior thereof opposed wall surfaces which are in contact with the drilling fluid flowing through conduit 10. The conduit 10 is provided with an appropriate inlet 12 to receive the gas cut mud, shown at the left in FIG. 1, and an outlet 14 for the degassed mud outflow. As will be apparent from the description below, the top of tank or conduit 10 is essentially closed with a pipe 16 communicating with the interior of conduit 10 to receive the gas liberated incident performing the degassing operation within the apparatus. A suitable gas exhauster 18, preferably of a centrifugal type, can be used to draw off the gas through pipe 16. A conduit 20 is connected to exhauster 18 to carry the removed gas away from the hazard area adjacent the well drilling site.

The conduit 10, in the structural example shown, has a top wall 22 which supports a driving motor 24 that has a rotating output shaft 26. Motor 24 may be of any suitable form adapted to the location where the degassing aparatus is to be employed. Thus the motor shaft 26 may be electrically, hydraulically, pneumatically or otherwise rotated depending upon the selection of the particular motor 24.

A coupling 28 of appropriate conventional construction is employed to couple rotating shaft 26 of motor 24 with the drive means 30 which operates as hereinafter described to generate the forces that impart elliptically oscillating movements to the cavitator 32 that is mounted in conduit. Before describing the structural features of the force generating drive means 30, reference may be made to cavitator 32 which is mounted within conduit 10.

Figure 3:
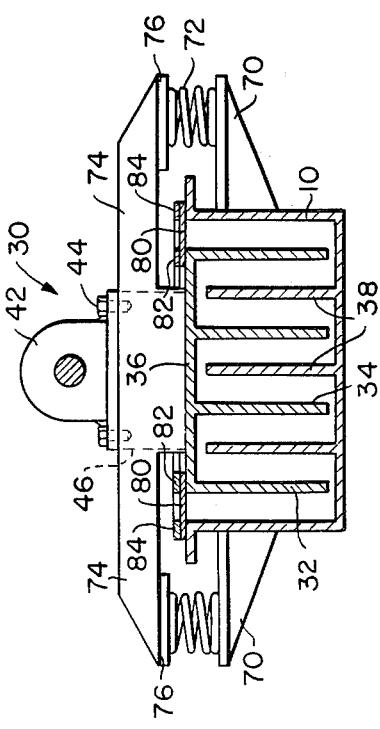
FIG. 3 is a sectional view taken on line 3—3 of FIG. 2.

In the embodiment shown in section on FIG. 3 of the drawings, cavitator 32 is provided with four downwardly extending walls 34 secured at their upper ends to a bed 36 of cavitator 32. It is to be understood that these walls 34 extend longitudinally within the length of conduit 10 and are generally of the length of bed 36 of cavitator 32. Also as shown in FIG. 3, the interior bottom of conduit 10 is provided with upstanding wall dividers 38. With cavitator 32 in place the walls 34 of the cavitator are disposed intermediate the upstanding wall dividers 38 of conduit 10. Dividers 38 are also intended to extend longitudinally of conduit 10 relative to the length of the walls 34 of cavitator 32.

It will be apparent from the showing on FIG. 3 that the interior walls of conduit 10 along with the wall dividers 38 provide opposed wall surfaces that will contact the drilling fluid flowing longitudinally through conduit 10. Likewise, the walls 34 on bed 36 of cavitator 32 provide surfaces in contact with the drilling fluid which are spaced from these opposed wall surfaces of conduit 10.

Figure 4:
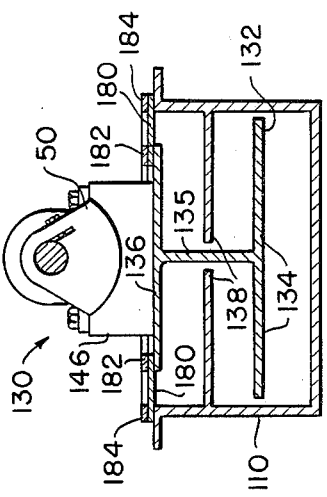
FIG. 4 is a sectional view showing an alternative cavitator and conduit wall surface arrangement.

At this point, reference may be made to the alternative cavitator structure shown on FIG. 4. A force generating drive means 130 is shown mounted on cavitator 132. These components are then supported for elliptically oscillating movements on and relative to conduit 110.

The cavitator 132 is provided with laterally extending walls 134 connected by web 135 to the underside of bed 136, all of which form the alternative structure of cavitator 132. To cooperate with cavitator 132 the upstanding sides of conduit 110 are formed to have inwardly projecting wall dividers 138. Thus, as in the case of the previously described embodiment shown on FIG. 3, the wall dividers 138 and innerwalls of conduit 110 provide opposed wall surfaces that are in contact with the drilling fluid flowing through conduit 110. Likewise, the walls 134 and web 135 provide cavitator surfaces on cavitator 132 that are in contact with the drilling fluid flowing through conduit 110.

The construction of force generating drive means 30 may now be described in more detail.

Drive means 30 has a shaft 40 rotatably mounted in spaced pillow blocks or bearings 42. The spaced bearings 42 are secured by cap screws 44 to mounting blocks 46. Blocks 46 are suitably affixed to the upwardly facing surface of the bed 36 of cavitator 32.

Shaft 40 is mounted in bearings 42 so as to be aligned with the rotational axis of shaft 26 of motor 24. The adjacent ends of shafts 26 and 40 are drivingly interconnected by coupling 28. It will be understood that coupling 28 may be of any suitable conventional form such that it will transmit rotative driving force from motor shaft 26 to rotatably drive shaft 40 while serving to isolate vibrating movements of shaft 40 from transmission to shaft 26 and other parts associated with conduit 10. An appropriate commercially available Dodge coupling may be used. Generally, two axially aligned hubs bonded to the opposite ends of a rubber-like material disk can form an appropriate coupling.

In the embodiment of the drive means 30 illustrated, the shaft 40 has eight eccentric weight elements 50 releasably secured to the shaft. With the two spaced bearings 42 rotatably supporting shaft 40, these eight eccentric elements 50 are grouped along the length of shaft 40 in four spaced pairs. Utilizing pairs of elements 50 has an advantage in that the two elements within each pair may be differently oriented relative to each other and to the axis of shaft 40. Then they can be fixed on the shaft in this selected oriented relationship. This is of advantage in enabling the degassing apparatus to be adjusted to obtain the desired elliptically oscillating movements of cavitator 32 within conduit 10 in relation to the nature of the drilling fluid to be degassed by the apparatus.

Obviously, upon rotation of shaft 40, which may occur at speeds of 1,100 to 3,600 revolutions per minute, the eccentricity of weight elements 50 relative to the axis of shaft 40 will generate the desired forces to impart elliptically oscillating movements to the cavitator 32. While operating at such speeds, the weight of eccentric elements 50 can impress severe stresses on bearings 42 and shaft 40. The bed 36 of cavitator 32 may be 60" in length. Even with shaft 40 having a diameter of 2" it is desirable to minimize the vibratory stresses imparted by eccentric elements 50 to the essentially stationary parts of the apparatus.

Accordingly, in utilizing this invention, it is desirable to have each pair of eccentric weight elements 50 spaced equally from the center of the bearing 42 to which it is closest. Thus, as shown on FIG. 1, the two pairs of eccentric elements 50 toward the outer free end of shaft 40 are spaced equidistant from the center of the left bearing 42 shown on FIG. 1. By the same token, the two pairs of eccentric elements 50 disposed on shaft 40 located toward drive motor 24 are spaced equally on opposite sides of the center of the bearing 42 that is shown to the right on FIG. 1. In a further effort to minimize vibratory effects caused by high speed rotation of eccentric weight elements 50, it has also been found desirable that the spacing between bearings 42 relative to the overall length of shaft 40, from coupling 28 to its free outer end, be properly relative to each other. Accordingly, the length of shaft 40 extending outwardly from the center of the left bearing 42 on FIG. 1 to the free shaft end should be equal to the length of shaft 40 that extends from the center of the right bearing 42 on FIG. 1 to the center of coupling 28. Additionally, it has been found desirable that the length of shaft 40 disposed between the centers of the two bearings 42 be effectively twice the length of shaft that extends outwardly from each bearing 42. It is believed that this spacing of the pairs of eccentric elements 50 relative to each bearing 42 and also the lengths of the shaft segments extending from each bearing 42 by having the above-described relationship will result in minimizing the vibratory effects that are imparted by rotation of shaft 40 carrying the eccentric weight elements 50 thereon.

Figure 5:
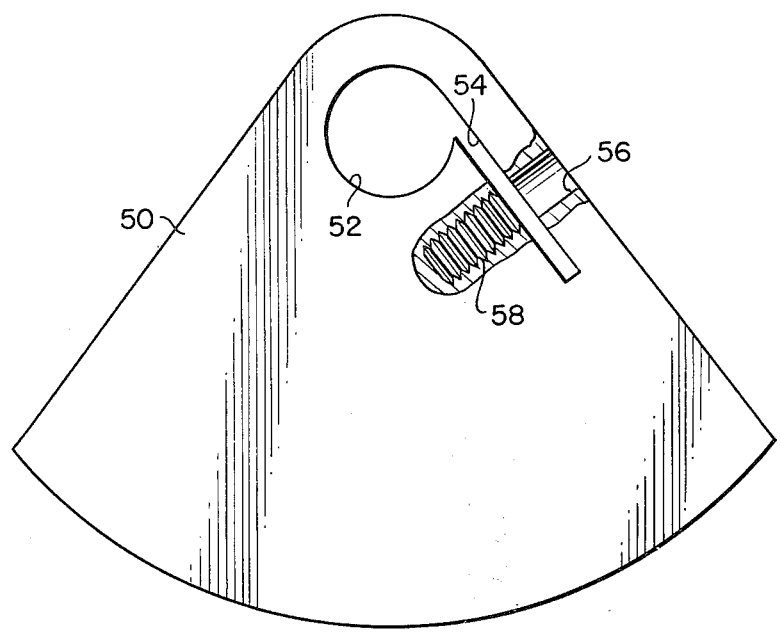
FIG. 5 is an end view of an eccentric weight element for the force generating drive means.
Figure 6:
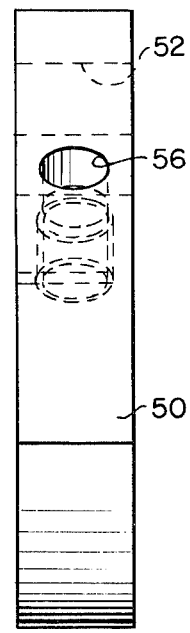
FIG. 6 is an edge view of the eccentric weight element shown in FIG. 5.
Figure 8:
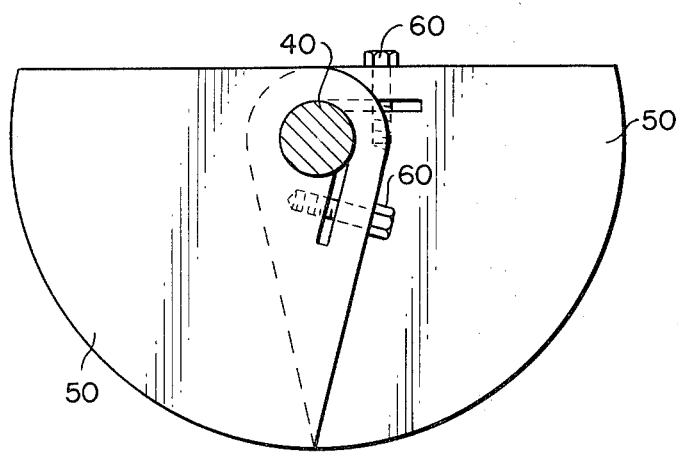
FIG. 8 is an end view showing a pair of eccentric weight elements fixed to the drive means shaft in the open relation of such elements.
Figure 7:
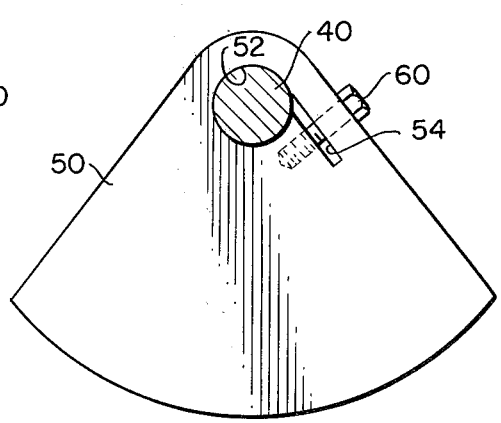
FIG. 7 is an end view showing an eccentric weight element fixed to the drive means shaft.
Figure 9:
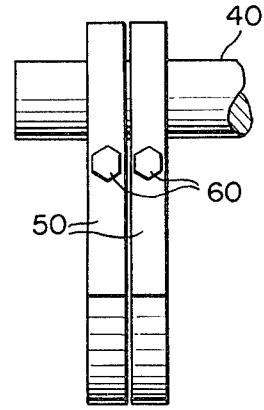
FIG. 9 is a side view of a pair of eccentric weight elements fixed in closed relation relative to the drive means shaft.

The configuration of each eccentric weight element 50 is illustrated best on FIGS. 5 and 6. FIG. 7 shows how the eccentric element 50 is releasably secured such that it may be selectively oriented and thereafter fixed relative to the rotation of shaft 40 in force generating drive means 30. FIGS. 8 and 9 on the drawings show how a pair of eccentric elements 50 may be oriented and then fixed relative to the axis of shaft 40. FIG. 8 shows a pair of elements 50 in their opened condition whereas FIG. 9 shows a pair of elements 50 oriented to a relation on shaft 40 to lie in their closed condition.

As shown in FIGS. 5 and 6, each eccentric weight element 50 has a cylindrical bore 52 of a diameter to snuggly fit over the shaft 40. The body of element 50 also has a slot 54 formed to extend tangentially from the cylindrical bore 52. Intermediate the ends of slot 54 a hole 56 is drilled normal to slot 54 and tapped at 58. The tapped portion 58 on the other side of slot 54 from hole 56 threadably receives a cap screw 60, as shown in FIGS. 7 and 8.

As heretofore mentioned it is desirable that the eccentric elements be releasably secured to shaft 40 such that they may individually be selectively orientated and thereupon fixed in this desired oriented relation to the rotation axis of shaft 40. It will be obvious that with eccentric weight elements 50 formed as heretofore described and illustrated on FIGS. 5 and 6, each element 50 may be slid onto shaft 40 by the shaft passing through the bore 52 of the eccentric element 50. When each element 50 is appropriately positioned on shaft 40 the cap screw 60 is tightened down to the point that slot 54 is slightly compressed thereby reducing the diameter of bore 52 such that the eccentric element 50 is firmly fixed to rotate with shaft 40. It will of course be understood that in assembling the pairs of eccentric elements 50 as shown in FIGS. 1 and 2, the two pairs between bearings 42 will be moved into place on shaft 40 before one or both of bearings 42 are positioned on the shaft and affixed to the bed 36 of the cavitator 32.

When the pairs are spaced along the length of the shaft and the shaft positioned relative to the bearings 42 in their relationship heretofore described, the eccentric elements 50 making up each pair are selectively oriented to the relationship within each pair such that the desired elliptically oscillating movements will be imparted to the cavitator 32. Each pair of eccentric elements 50 may be oriented to their fully opened condition relative to shaft 40 as shown in FIG. 8 or to their fully closed condition in relation to each other and shaft 40 as shown in FIG. 9 or the two elements of each pair may be oriented in other relations to each other. Likewise, the pairs of eccentric elements 50 may be oriented differently along the length of shaft 40. In all events, the orientation and then fixing of each eccentric weight element 50 on shaft 40 for rotation therewith will be dictated by the particular character of the drilling fluid that is to be handled and the forces that are to be generated by the driving means in achieving the desired elliptically oscillating movements of the cavitator to perform degassing.

In mounting the force generating drive means 30 relative to the conduit 10, it is desirable that the forces generated by the drive means as necessary to achieve the elliptically oscillating movements of the cavitator be isolated or not transmitted to the conduit 10 or other surrounding structures. To achieve this, the drive means 30 is mounted by a flexible wall means, to be subsequently described, and an isolating spring assembly.

The isolating spring assembly is provided by laterally projecting supports 70 appropriately affixed to the outer upstanding sides of conduit 10. Two such supports 70 are shown spaced along each of the sides of conduit 10. A coil spring 72 is supported on the upwardly facing surface of each support 70. The bed 36 of cavitator 32 is provided on its upper surface with a member providing laterally extending arms 74 each of which has at its outer end a downwardly facing pad 76 that rests on the upper end of one of the coil springs 72. Accordingly, the springs 72 serve to support the major portion of the weight of force generating drive means 30 while still acting to isolate any vibratory actions created in operation of such drive means. The use of the isolator springs 72 to essentially support the force generating drive means 30 contributes to free body movement for oscillation of the cavitator 32 in its elliptical patterns. It should be understood that the springs 72 specifically illustrated may be replaced by rubber members or any shock absorbing material. Alternatively, the drive means 30 may be suspended from above by hanging it on springs or rubber shock absorbers.

It is also deemed important that the top of conduit 10 be essentially closed against undesired escape of gas that has been liberated from the drilling fluid incident its flow through conduit 10 of the degassing apparatus. To achieve this, a yieldable gasket 80 provides wall means which is secured between the upper edges of the conduit 10 and the perimeter of the bed 36 of cavitator 32. Gasket 80 is made of flexible material which permits free movement of cavitator 32 relative to conduit 10 incident operation of the force generating drive means 30. The gasket 80, formed from a yieldable material such as an elastomer, is sealingly affixed along its opposite edges to the conduit 10 and to the cavitator 32, respectively, to preclude escape of fluid or gas from between conduit 10 and cavitator 32. Importantly, the avoidance of gas escape from the gas cut mud flowing through conduit 10 assures against the danger of gas leaking from the degassing apparatus. The gas is fully collected and led off through pipe 16 by way of exhauster 18 and conduit 20.

The gasket 80 is sealingly affixed along its opposite edges by means of hold down strips 82 secured along the inner edges of such gasket. These are affixed (by means not shown) to the upwardly facing perimeter of bed 36 on cavitator 32. Similarly, the outer edges of gasket 80 are sealingly secured to the upper end of conduit 10 by means of hold down strips 84, these strips being appropriately affixed (by mean not shown) to the upper end of the walls of conduit 10.

Reference may be made to the showing of an alternative embodiment in FIG. 4 on the drawings. Cavitator 132 has laterally extending walls 134 supported from the bed 136 of the cavitator by web 135. The interior of conduit 110 is provided with wall dividers 138 extending inwardly from the opposite sidewalls of conduit 110.

A force generating drive means 130, similar to that heretofore described with respect to drive means 30, is mounted through the intermediary of blocks 146 on the bed 136 of cavitator 132. A gasket 180 forms wall means which is secured between the conduit 110 and the bed 136 of cavitator 132 to preclude escape of fluid or gas from between the conduit and the cavitator. This gasket 180 is preferably made of a yieldable material such as an elastomeric material and is affixed along its inner edges to bed 136 of cavitator 132 by hold down strips 182. The outside edges of the gasket 180 are affixed to the upper end of conduit 110 by hold down strips 184. For simplicity in illustration, the means for securing the strips 182 and 184 over the edges of gasket 180 are not shown.

On the drawings, the operative surfaces as between the conduits 10 and 110, cavitators 32 and 132 are shown parallel to one another. On the other hand, it is to be understood that these surfaces may be at any angle from their vertical relationship as shown in FIG. 3 to their horizontal relationship as shown in FIG. 4. Presently, the vertical arrangement appears to be preferable. Additionally, the walls of the cavitator and wall dividers of the conduit interior can have any configuration varying from the flat surfaces shown to these surfaces being corrugated. These walls or wall dividers may be provided with holes if desired. However, the flat configuration is preferred.

General comment may be made concerning the drilling fluid degassing achieved by use of the apparatus and method of the instant invention. The force generating drive means 30 or 130 imparts elliptically oscillating movements to the cavitator 32 or 132. Consequently, the drilling fluid flowing through the conduit 10 or conduit 110 is alternately compressed or rarefied between the conduit wall surfaces and the cavitator surfaces. This elliptically oscillating movement between the respective surfaces promotes coalescence of small entrained gas bubbles into larger bubbles which may rise to the fluid surface for removal. The elliptical motion of the cavitator in contact with the drilling fluid generates highly effective movement of the surfaces relative to one another to thereby achieving much more efficient degassing.

The character of the elliptically oscillating movements that are imparted to the cavitator may be simply and effectively modified as desired by reason of the eccentric weight elements 50 being releasably secured to shaft 40. Thus, these elements may be individually and selectively oriented, and then fixed relative to rotation of the shaft. Opening or closing the positions of a pair of eccentric elements 50 will serve to increase or decrease the force values transmitted to the cavitator. The traverse movement of the oscillating cavitator bed of the machine will thereby be altered. The adjustment of these eccentric weight elements 50 can be changed as needed to comply with the different drilling fluid weights which are to be degassed. As heretofore mentioned equal weight distribution between the eccentric weight elements 50 and the weight of the shaft relative to the spaced bearings is important to avoid premature failure or distortion of the shaft relative to the bearings.

Where the eccentric weight elements 50 are in the opened condition as affixed to shaft 40, the elliptical oscillation pattern of movement gives greater exposure of the cavitator surfaces that are in contact with the drilling fluid than occurs when the eccentric weight elements 50 are disposed in a closed condition such as shown in FIG. 9. This greater elliptical movement induces the entrained gas to more readily rise to the surface than is achieved with the lesser movement occasioned by the eccentric weight elements 50 being in closed position. Basically, the greater cavitator movement in a lateral direction relative to conduits 10 or 110 is advantageous when high gas cuts, i.e., a greater quantity of entrained gas in the drilling mud, are encountered and are to be dealt with. With high gas cuts the mud is more compressible by reason of the greater amount of entrained gas within the drilling fluid.

It is to be understood that, while the invention has been illustrated and described in various preferred forms, numerous other modifications and variations, all within the scope of this invention, will readily occur to those skilled in the art. Obviously, the configuration of the cavitators 32 or 132 and of the conduits 10 or 110 may be altered by a variety of arrangements of the relatively movable surfaces on the cavitator and conduit. These changes may be made without departure from the intended scope and spirit of this invention. Accordingly, the scope of this invention is not to be limited by the embodiments disclosed herein but is to be determined solely by the claims appended hereto.

I claim:

1. A method for removing entrained well gas from drilling fluid comprising the steps of:
   conducting drilling fluid between opposed wall surfaces of a degassing chamber in a substantially closed degassing system isolated from the ambient in which a movable cavitator is disposed within the drilling fluid flow intermediate said opposed wall surfaces with the cavitator surfaces contacting said drilling fluid; and
   imparting elliptically oscillating movements to said cavitator from outside of said degassing chamber through the wall thereof while at the same time preventing the escape of gas therefrom to alternately compress and rarefy said drilling fluid between said wall surfaces and said cavitator surfaces and thereby promote coalescence of small entrained gas bubbles into larger bubbles which may rise to the drilling fluid surface for removal.

2. Apparatus for removing entrained well gas from drilling fluid comprising:
   a conduit having inlet and outlet means for flow of drilling fluid therethrough, said conduit providing opposed wall surfaces to contact the drilling fluid and defining a degassing chamber which is substantially isolated from the ambient;
   a cavitator providing surfaces respectively spaced from said opposed wall surfaces of said conduit;
   means movably mounting said cavitator within said conduit for said cavitator surfaces to contact drilling fluid flowing through said conduit and preventing the escape of fluid or gas from said conduit during movement of said cavitator; and
   drive means mounted externally of said conduit and drivingly connected to said cavitator, said drive means being operable to generate forces imparting elliptically oscillating movements to said cavitator whereby drilling fluid flowing through said conduit is alternately compressed and rarefied between said conduit wall surfaces and said cavitator surfaces to promote coalescence of small entrained gas bubbles into larger bubbles which may rise to the fluid surface for removal.

3. Apparatus as recited in claim 2 wherein said mounting means includes wall means secured between said conduit and said cavitator acting to preclude escape of fluid or gas from between said conduit and said cavitator, said wall means being flexible to permit said movements of said cavitator relative to said conduit.

4. Apparatus as recited in claim 3 wherein said wall means is provided by a yieldable material sealingly affixed along its opposite edges to said conduit and to said cavitator, respectively.

5. Apparatus as recited in any of claims 2, 3 or 4 wherein said drive means includes rotatably driven shaft means supported on said cavitator, said shaft means having eccentric weight means provided by at least one eccentric element rotatable with said shaft means.

6. Apparatus as recited in claim 5 wherein said cavitator provides a supporting bed, bearing means are secured to said bed, and said shaft means is rotatably supported in said bearing means.

7. Apparatus as recited in claim 5 wherein said shaft means is rotatably supported in spaced bearings secured to said cavitator, and an eccentric element is provided spaced from each of said bearings with the eccentric elements being equally spaced relative to each bearing.

8. Apparatus as recited in claim 5 wherein said eccentric weight means is provided on said shaft means by eccentric elements, said elements being releasably secured to said shaft means so as to enable each said element to be selectively orientated and fixed relative to the rotation axis of said shaft means.

9. Apparatus as recited in claim 8 wherein said eccentric elements are associated in pairs that are spaced longitudinally of said shaft means.

10. Apparatus as recited in claim 9 wherein said shaft means is rotatably supported in spaced bearings secured to said cavitator, and each pair of said eccentric elements is spaced equally from each of said bearings.

11. Apparatus as recited in claim 10 wherein said shaft means on said cavitator has equally projecting lengths extending away from each of said bearings.

12. Apparatus as recited in claim 5 wherein said shaft means is driven by motor means connected by vibration isolating coupling means to drive said shaft means.

13. Apparatus as recited in any of claims 2, 3 or 4 wherein said cavitator includes at least one wall extending longitudinally thereof, and said conduit has at least one wall divider extending inwardly within the conduit interior and longitudinally of said interior, said wall and said wall divider being disposed generally parallel to each other.

14. Apparatus as recited in claim 13 wherein said wall and said wall divider are generally vertical.

15. Apparatus as recited in claim 13 wherein said wall and said wall divider are generally horizontal.

* * * * *